(12) United States Patent
Segal (10) Patent No.: US 7,031,280 B2
(45) Date of Patent: Apr. 18, 2006

(54) METHOD AND APPARATUS FOR HAND OVER OF CALLS

(75) Inventor: Niranjan N. Segal, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 80 days.

(21) Appl. No.: 10/831,824

(22) Filed: Apr. 26, 2004

(65) Prior Publication Data

US 2005/0237978 A1    Oct. 27, 2005

(51) Int. Cl.
*H04Q 7/24* (2006.01)
*H04J 3/22* (2006.01)

(52) U.S. Cl. .............. 370/331; 370/338; 370/465; 455/436

(58) Field of Classification Search ............ None
See application file for complete search history.

(56) References Cited

U.S. PATENT DOCUMENTS

| | | | | |
|---|---|---|---|---|
| 2002/0141358 A1* | 10/2002 | Requena | ............ | 370/329 |
| 2002/0147008 A1* | 10/2002 | Kallio | ............ | 455/426 |
| 2003/0125021 A1* | 7/2003 | Tell et al. | ............ | 455/426 |
| 2003/0134650 A1* | 7/2003 | Sundar et al. | ............ | 455/465 |
| 2003/0137962 A1* | 7/2003 | Tsirtsis et al. | ............ | 370/338 |
| 2004/0052226 A1* | 3/2004 | Frank et al. | ............ | 370/329 |
| 2004/0264410 A1* | 12/2004 | Sagi et al. | ............ | 370/331 |
| 2004/0266426 A1* | 12/2004 | Marsh et al. | ............ | 455/426.2 |

OTHER PUBLICATIONS

R. Sparks; "The SIP Refer Method draft-ietf-sip-refer-07"; Network Working Group; pp. 1-21.

* cited by examiner

*Primary Examiner*—Alpus H. Hsu
*Assistant Examiner*—Justin M. Philpott
(74) *Attorney, Agent, or Firm*—Frank J. Bogacz; Kevin D. Wills (57) ABSTRACT

A wireless communication unit (101, 200), network switch (112, 300) and corresponding methods facilitate routing and handover or handin of calls from a second network (105) to a first network (103) when the unit has been operating in second network and is being handed in to the first network. The communication unit comprises a transceiver (203) and a controller (209) arranged to operate with the transceiver to determine (503) that the wireless communication unit is within a coverage area of the first network; to exchange messages (505, 507) corresponding to call appearance information with the switch in the first network; to decide whether a call within the second network can be handed in to the first network based on the exchange of the messages (507); and to initiate (519, 619) a handin of the call to the first network only when the decision is affirmative.

13 Claims, 6 Drawing Sheets

METHOD AND APPARATUS FOR HAND OVER OF CALLS

FIELD OF THE INVENTION

The present invention relates in general to communication units and coupled networks, and more specifically to methods and apparatus to facilitate hand over of calls for communication units operating within such networks.

BACKGROUND OF THE INVENTION

Wireless Local Area Networks (WLANs) are being contemplated or are known. Voice services in WLANs are typically supported by WLAN servers that may be referred to as private branch exchanges (PBXs) or enterprise servers. The PBX normally provides a control and switching function for the WLAN and communication units operating therein or users thereof. The WLAN can be an attractive and inexpensive alternative for typical voice services such as telephony or dispatch services and may provide additional amenities such as high-speed wireless Internet and Intranet access as well as other real-time applications that may be more specific to a given enterprise.

Wireless wide area networks (wireless WANs or WANs), such as conventional cellular telephone systems, are also known. Such networks provide the advantage of wide area coverage but may not be economically attractive for routine access to wideband or high speed data capabilities, such as are required for certain Internet or Intranet applications. Nevertheless a communication unit that is operating on a WLAN may move beyond the effective service area for the WLAN and thus need support or services from a WAN. Similarly a communication unit that is operating in the WAN may enter the coverage area of a WLAN and want to transfer ongoing calls to the WLAN in order to use services available via the WLAN or avoid costs and the like for using the WAN. In situations, sometimes referred to as loosely coupled systems, where the WAN is indirectly coupled to the WLAN via the public switched telephone network (PSTN) or communication unit operating thereon this can present problems, such as whether to hand in a call or particularly multiple calls without unduly complicating the underlying systems or communication units or dropping calls or otherwise being an inconvenience to users.

Therefore, a need exists for methods and apparatus to facilitate handin of calls from one system to another for communication units operating within such coupled communication networks

BRIEF DESCRIPTION OF THE DRAWINGS

The accompanying figures where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

In overview, the present disclosure concerns wireless communication devices or units, often referred to as communication units, such as portable or cellular phones or handsets or two-way radios and the like and communication networks or systems that provide services such as voice and data communication services to or for such communication units. More particularly various inventive concepts and principles are embodied in coupled, typically loosely coupled communication systems or constituent elements, communication units, and methods therein for routing or handing over or handing in and managing calls for the communication unit as the unit moves from one communication network to a another communication network. Note that "wireless communication unit" may be used interchangeably herein with "communication unit", "communication device" or "unit" and each of these terms denotes a device ordinarily associated with a user and typically a wireless communication unit that can be used with a public network, such as cellular network as well as a private or enterprise network. Examples of such units include personal digital assistants, personal computers equipped for wireless operation, cellular or dispatch handsets or devices, or equivalents thereof provided such units are arranged and constructed for operation in different networks.

The communication systems or networks and communication units that are of particular interest are those that may provide or facilitate voice communication services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, 4G OFDM (Orthogonal Frequency Division Multiple access) systems, integrated digital enhanced networks and variants or evolutions thereof. Furthermore the networks and the wireless communication units or devices of particular interest have short range wireless communication capability normally referred to as wireless local area network (wireless LAN or WLAN) capabilities based on standards such as IEEE 802.11, Bluetooth, or Hiper-Lan and the like that preferably utilize CDMA, frequency hopping, OFDM or TDMA access technologies and one or more of various networking protocols, such as TCP/IP (Transmission Control Protocol/Internet Protocol), UDP/IP (User Datagram Protocol/IP), IPX/SPX (Inter-Packet Exchange/Sequential Packet Exchange), Net BIOS (Network Basic Input Output System) or other protocol structures.

As further discussed below various inventive principles and combinations thereof are advantageously employed to facilitate management, routing, or handin or hand over of one or more active or on-hold calls from one wireless communication network to provide these on-hold calls to the communication unit while operating in a another wireless communication network. This is facilitated in one exemplary embodiment where calls are handed over from a second network, such as a WAN, to a first network, such as a WLAN by first determining whether it is possible to hand in the call (e.g. is the call or bearer portion of the call routed through the WLAN) by exchanging call appearance information between a communication unit and a network switch or call control function in the first network, and if possible then initiating the hand in of the call or concurrently hand in of multiple calls when the wireless communication unit moves to the second network. In this manner, advantageously calls may be routed to the communication unit without dropping active or on hold calls or otherwise burdening the user of a communication device in a coupled or loosely coupled communication network or system, e.g. where the second network is not aware of the first network, since the first and second network are only coupled via the PSTN and use only conventional wired telephony protocols to communicate.

The instant disclosure is provided to further explain in an enabling fashion the best modes of performing one or more embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processors or general purpose processors and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Figure 1:
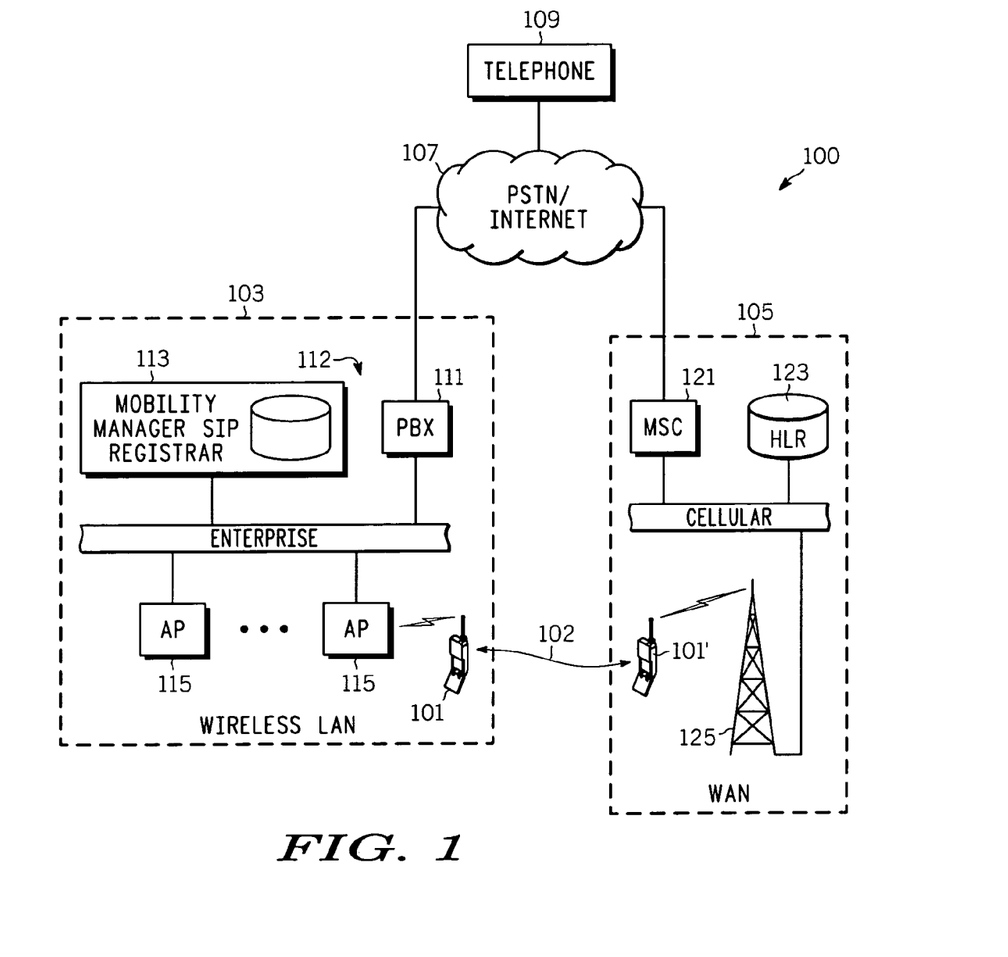
FIG. 1 depicts, in a simplified and representative form, an exemplary system diagram for a loosely coupled communication network where methods and apparatus facilitating the handin or handover of calls can be advantageously utilized.

Referring to FIG. 1, an exemplary and representative environment or system diagram for a loosely coupled communication network 100 will be discussed and described where methods and apparatus facilitating the handover or handin and routing of calls, such as active and on-hold calls can be advantageously utilized. In one embodiment one or more calls are present for and the corresponding wireless communication unit is operating in a second network, such as a wireless WAN. The wireless communication unit has ventured into the coverage are of a first network, such as a wireless LAN, and the calls in the second network need to be made available to the communication unit in the first network. The diagram of FIG. 1 generally shows a communication unit 101 that is portable or mobile and that can move (depicted generally by arrow 102 and communication unit 101') throughout a service area of a first wireless communication network (first network) 103 and a service area for a second wireless communication network (second network) 105. The wireless communication unit 101 ordinarily has a first network number and IP address so that other units can contact the unit in the first network as well as a second network number so that other units can contact the unit in the second network. Note that in practical systems there may be a multiplicity of such wireless communication units where for the sake of simplicity one has been depicted.

In this exemplary embodiment, the first network 103 is or includes a wireless local area network (WLAN) using packet data based methodologies including VoIP (Voice Over IP) and the second network 105 is, in one embodiment, a WAN, such as a cellular voice or packet data network or other cellular or cellular like network otherwise referred to as a cellular WAN or simply WAN. While the arrow 102 and alternative location for wireless communication unit designated 101' suggest physical movement, this may not be the case since the WAN likely has overlapping coverage with the wireless LAN. The arrow may simply denote a change in which network the communication unit is operating on or registered on for a variety of reasons. The first communication network or wireless LAN is inter coupled to the second communication network as well as other communication devices such as plain old telephone set (POTS) 109 or IP phones by a public network, such as the public switched telephone network or Internet 107.

The first network 103 in the wireless LAN embodiment includes a communication network switch 112 comprising in certain embodiments a switching function 111 that may alternatively be referred to as Private Branch Exchange (PBX), enterprise server, media gateway controller (MGC) and so on and a mobility manager 113. The PBX 111 and mobility manager 113 are inter coupled via the Enterprise infrastructure or wired portion of the LAN as well as further coupled to a plurality of access points 115. The access points support the wireless LAN air interface with the wireless communication units using, as noted earlier, a known protocol and associated techniques, such as one or more IEEE 802.11 protocols.

The first network 103 in one or more embodiments further relies on and utilizes an application level protocol for managing connections or sessions between the various network entities including wireless communication units. This protocol in one embodiment is a known Session Initiation Protocol (SIP) but other similar protocols, such as H.323, with similar functionality could be used. The protocol, known as H.323, is defined and promulgated by the International Multimedia Telecommunication Consortium (IMTC) (see http://www.imtc.org/h323.htm and associated websites for descriptive documents). The Session Initiation Protocol (SIP) is defined by the Internet Engineering Task Force (IETF) in a document designated RFC3261. Much of the discussion below, where relevant will assume that SIP and SIP constructs and entities are being utilized in the WLAN and that legacy cellular or dispatch protocols are being utilized in the WAN, where it is understood that similar functions and methods are available using other protocols if desired.

The mobility manager 113 includes, in the SIP embodiment, a known SIP Registrar, SIP Proxy, etc. The mobility manager 113 is responsible for maintaining network contact information (sometimes referred to as location information) for the various wireless communication units and thus is utilized by network entities as a central point for setting up connections or sessions with other network entities. The mobility manager will be described in further detail below with reference to FIG. 3.

The second network or WAN 105 includes a network switching function 121, alternatively referred to as a mobile switching center (MSC). The MSC is coupled to a home location registrar (HLR) 123 and numerous base transmitter sites (BTS) 125 all as known. The MSC 121 further comprises a visitor location registrar (VLR not specifically shown) as is known. The BTS 125 supports the air interface with the wireless communication units, such as unit 101', e.g. unit 101 when that unit is in the coverage area of and operating on the second network. Note that first and second networks will be used in the description but these terms may be interchanged, e.g. the first network could be a WAN and the second network a WLAN, or both could be WLANs for example, provided the appropriate functionality is available within such networks.

Also it will be appreciated that other entities or functions that are part of typical networks are not specifically shown but understood to be present and operational. For example in the first network 103 or WLAN, in addition to a multiplicity of Access Points 115 supporting wireless links with wireless communication units and thereby coupling the units to the balance of the network or enterprise network, other typical network routing equipment such as servers, concentrators, routers, etc. may be present. The second network or wireless WAN (hereafter WAN) similarly typically includes a plurality of base transmitters and antenna towers as well as base site controllers that all serve to provide a radio access network for communication units as well as various registrars, billing servers and so forth. Note that while the first and second networks 103, 105 are referred to as wireless networks, much of these networks or the respective elements thereof are inter coupled using terrestrial based links, e.g. cables or wires. For example, the switching functions 112, 121 are normally coupled to the balance of their respective networks using known cables or wires. Furthermore the WLAN 103 can include and support voice services for stationary or static communication units that are coupled to the network using conventional cabling or wires. Thus the discussions below may refer alternatively to the first communication network 103 as a WLAN or LAN.

With this network architecture where the networks are loosely coupled and thus the WAN is not aware of the wireless LAN, problems associated with handling, routing or retrieving calls are presented, particularly for existing calls (active or on-hold) when the communication unit wants to change from one network to another. Various terms are used to describe this change such as handout, handin, or handover. Handout often means changing from the enterprise or WLAN to the cellular or WAN, with handin applied to the corresponding change from WAN to WLAN. Handover is a term that may be applied to either situation. The meaning of these terms is of course situation and reference point specific and they will typically need to be interpreted in view of the context where they may be used. The above noted problems with a handover, handin, etc. are compounded by other factors such as the ability to have different numbers of calls present in a typical wireless LAN than can be handled in a typical WAN. For example a multiplicity, such as four, calls can be available in some embodiments of a wireless LAN whereas a typical WAN allows only two call appearances, e.g. an active call and an on-hold call or two on-hold calls. With this network discussion and description, the balance of these discussions will be devoted to various advantageous and inventive concepts and principles embodied as one or more apparatus and methods for resolving various of these issues.

Figure 2:
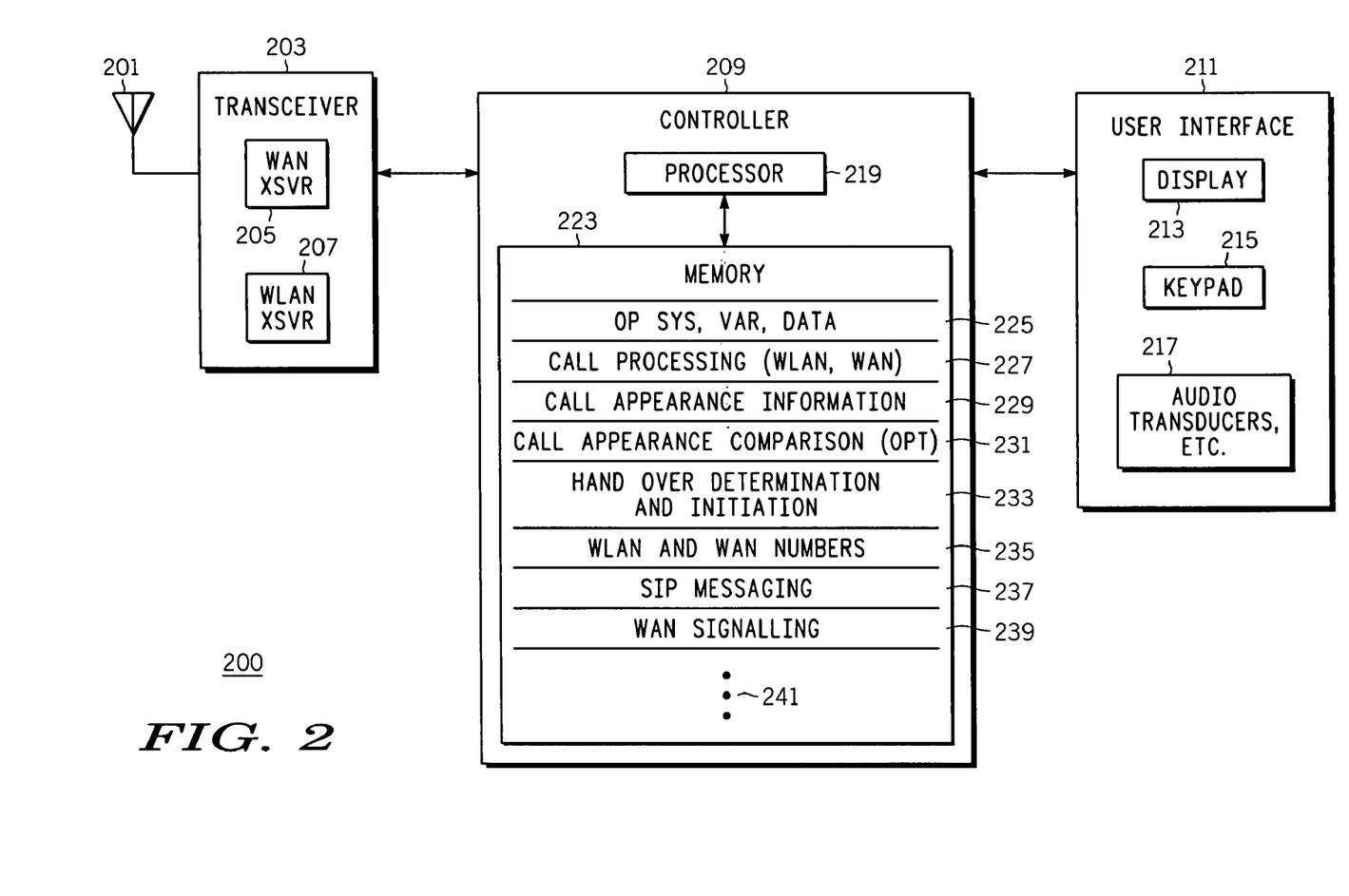
FIG. 2 depicts a simplified block diagram of a wireless communication unit arranged for facilitating the handover of calls in the system of FIG. 1.

Referring to FIG. 2 a simplified block diagram of a wireless communication unit, similar to communication unit 101 arranged for facilitating the handin or handover of calls in the system of FIG. 1, will be discussed and reviewed. The communication unit 200 is structurally similar or identical to communication units, such as wireless handsets, available from manufacturers like Motorola, however the functionality of these conventional units is modified according to the principles and concepts disclosed and described herein in order to enjoy the advantages noted. The communication unit includes an antenna 201 coupled to a transceiver 203. The transceiver 203 is composed of at least one transmitter/receiver but may as depicted be comprised of one or more WAN transceivers 205 (one shown) and one or more additional wireless LAN transceivers 207 (one shown). In one embodiment, one transmitter/receiver 205 is for communicating over a wide area network (WAN) while another transmitter/receiver 207 is for communicating over a wireless LAN. These transceivers and their functionality are generally known and whether embodied as one or several transceivers will depend on technologies employed as well as the air interface technologies utilized in the specific WANs and LANs that the communication unit is configured to interface to or interact with.

The transceiver 203 is coupled to a controller 209 and the controller is further coupled to a user interface 211. The controller 209 provides over all control for the communication unit, call processing, and interfacing tasks associated with the transceivers and user interface. The user interface includes a conventional display 213, a keyboard or keypad 215, audio transducers 217, and the like. The controller 209 further comprises a processor 219 and a memory 223 for storing software instructions and other information and data, the memory and processor, inter coupled as depicted, as well as likely other known functionality that is not relevant to the present discussion. The processor is comprised of one or more general purpose processors and digital signal processors available from various suppliers, including Motorola. The memory 223 can include both volatile and non-volatile memory and can be at least in part integral to the processor 219 or may also be external to the processor.

The memory 223 includes various software routines or programs and data including an operating system with variables and data 225 that when executed by the processor results in the controller performing the above generally identified duties as well as those tasks described below in conjunction with other routines. The other routines or programs include call processing routines 227 that are generally known and will vary with the specific requirements of the networks that are being utilized for service. Other routines and databases will be listed and their respective functionality will become evident with the detailed explanations below. These routines include (local) call appearance information 229, a routine for comparing local and obtained call appearance information 231, handover determination, processing, and initiation routines 233, wireless communication unit telephone numbers, including wireless LAN and WAN numbers 235, SIP messaging routines 237 for use, for example, in the wireless LAN, WAN signaling routines 239 for use while operating in the WAN, and various other routines and databases 241, such as phone books, user interface drivers, and various applications, that are not specifically shown and in many instances not further relevant but that will be evident to one of ordinary skill.

In operation, the communication unit 101, 200, as discussed above, is capable of and arranged and constructed for operating on or operation within a communication network comprising multiple communication networks, such as a first communication network and a second communication network that in one embodiment can be, respectively, the wireless LAN 103 and the wireless WAN 105. The wireless communication unit comprises the transceiver 203 that is configured to support an air interface with a first communication network, for example wireless LAN 103 and an air interface with the second communication network, for example WAN 105. Furthermore the communication unit comprises the controller 209 that is arranged to control and cooperatively operate with the transceiver to support these air interfaces and to determine that the wireless communication unit is within a coverage area of the first communication network using the call processing routines 227. For example, as is known, the communication unit scans for signals from the access points 115 and when a suitable signal (sufficient signal strength) is found operates to associate, authenticate, register, etc., e.g. access the WLAN or WAN. In the end if a suitable signal is discovered and the unit is authorized to operate on a corresponding system, then the unit is within the corresponding coverage area.

The controller with the transceiver further operates to exchange messages, such as session initiation protocol (SIP) messages using routines 237 corresponding to call appearance information with a network switch in the first communication network, e.g. WLAN and based on this exchange of messages to decide whether a call within the second communication network can be handed in to the first communication network and then provide a corresponding decision using routines 233. If and only when the decision is affirmative, the controller with the transceiver will operate to initiate a handin of the call to the first communication network using routines 233, 237, 227, for example.

In one embodiment, for example, to exchange the messages corresponding to the call appearance information further comprises the controller and transceiver operating for sending the call appearance information to a network switch in the first communication network and receiving an acknowledgment when the call appearance information is recognized by the network switch, the acknowledgment indicating that the decision is affirmative. In this embodiment, the call appearance information is sufficient to allow the network switch to uniquely identify calls associated with the communication unit, particularly those calls in the second communication network. For example, the call appearance information can comprise a call state map with a listing of call appearances, with each member of the listing comprising one or more of: a call identifier, a From field, a calling party address or number, a To field, a called party address or number, a call state field (active or on-hold), or a session description protocol (SDP) information. Various approaches are envisioned and one example of the sending the call appearance information further comprises sending a SIP INVITE message comprising a presence state identifying a handin request and the call appearance information and the receiving the acknowledgement further comprises receiving a SIP OK message. Note that this SIP INVITE message is known but includes novel presence state information comprising the handin request as well as at least call appearance information for calls that exist (active or on hold) in the second or WAN network.

In another embodiment, to exchange the messages corresponding to the call appearance information further comprises querying the network switch and receiving the call appearance information from the network switch, wherein the controller is operable to decide whether a call within the second communication network can be handed in based on a comparison of the call appearance information as received and local call appearance information 229, using the routines 231, at least for calls in the second communication network. A favorable comparison indicates the decision regarding possible handin is affirmative.

Generally, the issue to be determined or decided by the exchange of call appearance information is whether the network switch in the first communication network will recognize and is thus able to control or route the calls that are to be handed in from the second communication network. Normally this means that at least the bearer or payload portion of those calls must be routed through, sometimes referred to as anchored with or at, the network switch. Typically this is any call that the communication unit is involved in within the second communication network where one of the parties to the call at the time the call was setup was at some point identified with a first communication network address, such as first network phone number. Specific examples of calls that can be handed in and ones that can not will be provided in various portions of the following discussions.

In another embodiment, to exchange the messages corresponding to the call appearance information further comprises: querying the network switch using a Session Initiation Protocol (SIP) INVITE message, such as above discussed or a known SIP OPTIONS message, each respectively including at least call appearance information for calls in the second communication network and responsive thereto receiving a SIP OK message implicitly indicating the relevant calls are recognized and that a handin is otherwise approved, thus that the decision is affirmative. The alternative to the SIP OK message is various forms of SIP messages such as a SIP 403 message indicating the request is denied or the like. In order to further synchronize call appearance information between the wireless communication unit and the network switch as will be further discussed below with reference to FIG. 4 the unit can send additional SIP messages. These additional messages include for example a SIP SUBSCRIBE message including a first identity (enterprise number or first network phone number or address) for the wireless communication unit in the first communication network and a second identity (cellular number or second network address or number) for the wireless communication unit in the second communication network. Responsive to the SUBSCRIBE message the communication unit will receiving a listing of call appearance information for each call (often up to 4 or more calls if present) in the first communication network, typically in a SIP NOTIFY message.

Once it has been determined that the decision is affirmative, e.g. it is possible to hand in the call or calls from the second network, the controller with the transceiver will operate to initiate the handin of these calls. Various embodiments are envisioned. In one embodiment, for example, to initiate the handin of the call to the first communication network when the decision is affirmative further comprises sending to the network switch a known SIP INVITE message comprising a call identifying field, a To field with or including a first identity (number or address) for the wireless communication unit corresponding to the first communication network and a From field with a second identity for the wireless communication unit corresponding to the second communication network. This will result in the network switch replying with a SIP OK message and bridging in the appropriate calls to the communication unit as will be discussed in more detail below. Furthermore, when the call is a plurality of calls, to initiate the handin of the call comprises initiating a handin of the plurality of calls and the initiating the handin of the plurality of calls further comprises sending the network switch a SIP INVITE message corresponding to each of the plurality of calls. The SIP INVITE message corresponding to each of the plurality of calls comprises call identity information for the each of the plurality of calls. Thus with a plurality of SIP INVITE messages, one for each call to be handed in, the plurality of calls can be simultaneously or concurrently handed in to the first communication network.

Other known approaches for handing in calls contemplate shuffling calls in a WAN between active and on hold status and handing in one call at a time. These approaches can add complexity to the wireless communication unit forcing the unit to maintain a presence on both networks for example, are prone to errors when calls are not correctly identified or if one or the other network or controlling entity in the network changes status of a call as a result of changes in another call, etc.

In another embodiment, to initiate the handin of the call to the first communication network when the decision is affirmative further comprises sending to the network switch a known SIP REFER message including a From field with a second identity for the wireless communication unit corresponding to the second communication network, a field identifying the call, either directly such as a To field with a called party identifier, or indirectly such as a SDP dialogue with a call identifier, and a Refer to field with a first identity for the wireless communication unit corresponding to the first communication network. When multiple calls need to be handed in, e.g. to initiate the handin of the call comprises initiating a handin of a plurality of calls, the initiating the handin of the plurality of calls further comprises sending the network switch a SIP REFER message including the information noted above corresponding to each of the plurality of the calls, wherein the plurality of calls can be concurrently handed in to the first communication network.

Figure 3:
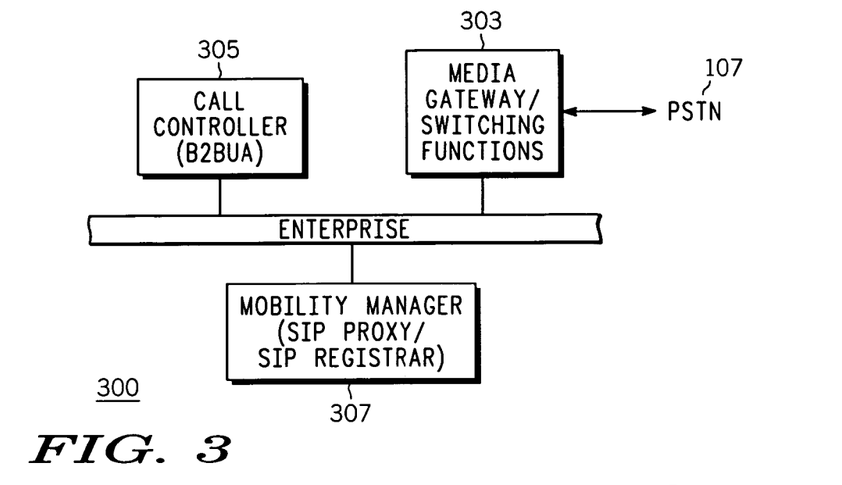
FIG. 3 is a simplified block diagram of a network switch that is arranged for handing in calls in the system of FIG. 1.

Referring to FIG. 3, a simplified block diagram of a communication network switch 300, such as the network switch 112, that is arranged for routing or handing in or over active and on-hold calls in the system of FIG. 1 will be discussed and described. The network switch 112 may serve a single enterprise location, such as an office building or may serve multiple enterprise sites, possibly located in different cities. The network switch 112 or enterprise server may serve a WLAN hotspot, or multiple WLAN hotspots. It may also serve one or more WLAN coverage areas in private homes that may be connected to the network switch 112 by such means as IP broadband connections. Generally the network switch operates to establish connections between wireless communication units within the WLAN, such as communication unit 101 and various peer communication units (not shown). Note that the connection from the wireless communication unit via an access point 115 is a packet data connection and the connection from the peer communication unit will depend on the particulars for the peer unit. For example if the peer communication unit is another static or wireless communication unit within the WLAN or LAN (not shown) the connection will also be a packet data based connection, while if the peer unit is an ordinary phone, such as POTS 109 outside the LAN or WLAN 103 the connection to the wireless LAN is likely a circuit switched voice connection.

The communication network switch 300 comprises a gateway or switching function 303 and a controller or call controller 305 including a B2BUA (back to back user agent, a SIP entity) such as available from Avaya with their MultiVantage product line. Rather than the B2BUA in some embodiments a conventional SIP server can be used as will be evident to those of ordinary skill. Generally the gateway or switching function operates to couple the wireless LAN and devices therein to the PSTN 107 and thus external phones, such as POTS 109, and other networks, such as the WAN 105. More specifically the switching function is routing traffic or calls between the various devices and networks. The controller 305 is responsible for call control and call signaling and handling active, on-hold or call waiting calls and handling connections of these calls among particular communication units. The B2BUA is included as part of the controller 305 to facilitate an interface using SIP constructs between the controller and the rest of the LAN including access points, communication units, the switching function 303 and a mobility manager 307.

The mobility manager 307 is included in certain embodiments of the network switch 300 and further often comprises a SIP Proxy and SIP Registrar. The mobility manager 116 operates to facilitate mobility of the wireless communication units within the wireless LAN as well as between networks. This includes facilitating handover activities for active calls and on-hold calls associated with communication units from one to the other network, e.g. WAN to WLAN or within the wireless LAN when required. The SIP proxy and SIP Registrar operate according to known techniques to provide a central point or network address that all communication units can contact when they intend to set up a call or connection with another unit. The proxy server/SIP Registrar will have the most up to date network contact or location information for or address, e.g. know where to find, another communication unit or the network switching function 110 in accordance with known techniques. The mobility manager and constituent functions in one or more embodiments can be implemented as software programs running on a general purpose, computing platform such as those available from suppliers, such as Hewlett Packard and Dell that are suitable for networked operation. The switching function 303, controller 305, and mobility manager 307 are all inter coupled or networked via the LAN as depicted. Note that one or more or all of these entities may be co-located in one or more common computing platforms according to the practitioner's desires and thus may be viewed as largely logically distinct entities. The discussions below will be devoted to the respective and relevant functionality and interaction of these respective entities with each other as well as other network entities pursuant to resolving the call routing and handover issues noted above.

The communication network switch 300 as earlier noted is operable to route calls for a first communication network, such as the wireless LAN 103 as well as route such calls to or from other networks, such as the WAN 105. The communication network switch comprises the switching function 303 that is operable to couple the first communication network to a second or other communication networks, via for example the PSTN 107, and thus communication units within such networks. Note that the first communication network and the second communication network thus comprise a coupled or loosely coupled communication network, such as network 100. The communication network switch further comprises the controller 305 that is arranged to control and cooperatively operate with the switching function 303 and mobility manager 307 to exchange messages corresponding to call appearance information with a wireless communication unit via the LAN and serving access point in various manners as noted above; to decide whether a call within the second communication network can be handed in to the first communication network based on the exchange of the messages corresponding to the call appearance information and provide a corresponding decision; and to initiate a handin of the call to the first communication network only when the decision is affirmative. Note that this initiation may include sending a SIP OK message to the communications unit and waiting for instructions from the unit that directs a handin.

A brief review of various embodiments of the network switch and operations that are performed by the switch or specifically the controller 305, etc will now be discussed. Much of this will be an overview with some of the specifics noted above applying here as well. Additional details will be discussed below with reference to FIG. 5 and FIG. 6. In one embodiment to exchange the messages corresponding to the call appearance information further comprises receiving the call appearance information from the wireless communication unit and sending an acknowledgment when the call appearance information is recognized by the network switch, the acknowledgment indicating that the decision is affirmative, e.g. a handin is possible. As noted above the call appearance information can comprise a call state map with a listing (each line) of call appearances, with each member of the listing comprising one or more of: a call identifier, a From field, a calling party number, a To field, a called party number, a call state field, or session description protocol (SDP) information.

A more detailed embodiment is where exchanging the messages corresponding to the call appearance information further comprises: receiving a query from the wireless communication unit, the query in a SIP INVITE message or in a SIP OPTIONS message, where the SIP INVITE or the SIP OPTIONS message respectively include the call appearance information at least for calls in the second communication network; comparing the call appearance information as received to local call appearance information to provide a comparison; and sending a SIP OK message when the comparison is favorable, thereby indicating the decision is affirmative.

Given that the a handin is possible as determined from the exchange of messages, one embodiment of initiating the handin of the call to the first communication network when the decision is affirmative further comprises: receiving from the wireless communication unit a Session Initiation Protocol (SIP) INVITE message comprising a call identifying field, a To field with a first identity for the wireless communication unit corresponding to the first communication network and a From field with a second identity for the wireless communication unit corresponding to the second communication network; and furthermore when the call is a plurality of calls, receiving a plurality of SIP INVITE messages corresponding, respectively, to the plurality of calls such that the plurality of calls can be concurrently or simultaneously handed in.

Another embodiment of initiating the handin of the call to the first communication network when the decision is affirmative further comprises: the receiving from the wireless communication unit a SIP REFER message with a From field with a second identity for the wireless communication unit corresponding to the second communication network, a field identifying the call, and a Refer to field with a first identity for the wireless communication unit corresponding to the first communication network; and when the call is a plurality of calls, receiving a plurality of SIP REFER messages corresponding, respectively, to the plurality of calls such that the plurality of calls can be concurrently handed in.

Figure 4:
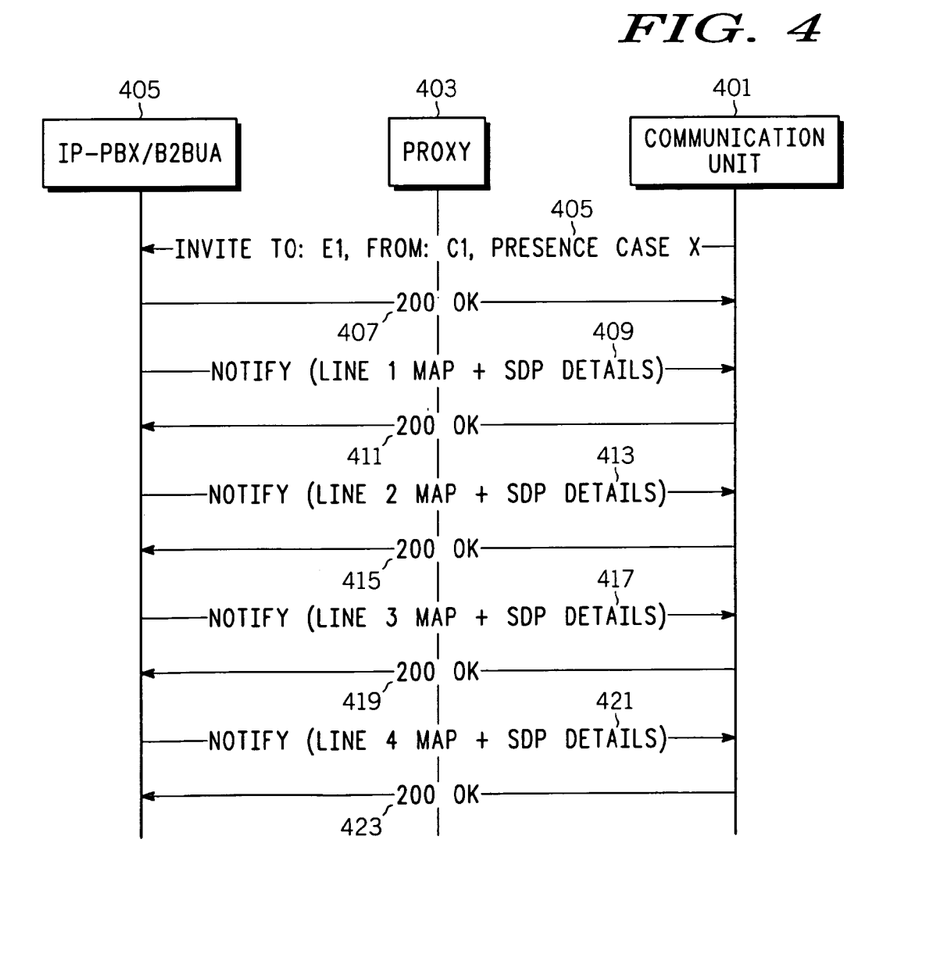
FIG. 4 depicts a ladder diagram depicting an exemplary embodiment of the signaling interaction between a wireless communication unit and network switch for synchronizing the wireless communication unit upon entry into a wireless LAN.

Referring to FIG. 4, a ladder diagram depicting in an exemplary manner the signaling interaction between a wireless communication unit or mobile station 401, such as wireless communication unit 101, 200, the SIP Proxy 403, and network switch 405, such as the communication network switch 112, 300, where the interaction for synchronizing the wireless communication unit upon entry into a wireless LAN will be discussed and described. As noted earlier this can be accomplished with a SIP SUBSCRIBE message and SIP NOTIFY message exchange. Note that alternative structures with similar functionality can also implement the methods depicted by the ladder diagrams and that various protocols, such as SIP and H.323 can be utilized. Generally synchronization may be required when the wireless communication unit is handed in to a wireless LAN, such as 103, when the wireless unit powers on via for example the user interface or as a result of a dead battery, and the like. During the time of absence for the wireless communication unit on-hold or active calls could have changed status, by for example, the calling party disconnecting the call and so forth. For these and other such reasons the list of valid call appearances in the wireless LAN may not match the memory call appearances as last known by the communication unit and thus synchronization of some form may be needed.

In any event the ladder diagram depicts a method of synchronizing call appearance information between a network switch and a wireless communication unit operable in a loosely coupled network, where the network includes as noted above a first communication network and a second communication network. The method comprises determining, after an absence, that the wireless communication unit is again present in the first communication network; and exchanging messages between the wireless communication unit and the network switch to provide a listing of call appearance information for calls corresponding to the wireless communication unit. Note that the determination on the communication unit's part is detecting, for example, beacon signals corresponding to and then associating with the wireless LAN in one IEEE 802.11 embodiment and on the part of the network switch receiving a message 406 comprising a SIP INVITE message. Thus in this embodiment, the determining that the wireless communication unit is present comprises exchanging a session initiation protocol (SIP) INVITE message 406 between the wireless communication unit and the network switch, where the SIP INVITE message can further include a presence state, such as walk in if the device has recently returned to the LAN after an extended absence, handin suggesting the device was operating in the WAN, or power up indicating the device is being powered up. Note that in one embodiment the SIP INVITE is To the LAN number, E1 and From the WAN number, C1 that corresponds to the wireless communication device.

Responsive to the Invite message a SIP OK message 407 is returned. While not depicted, in some embodiments the exchanging messages can comprise exchanging a SIP OK message that includes all or a portion of the listing of call appearance information, where the SIP OK message is directed to the wireless communication unit. In other embodiments, the exchanging messages further comprises exchanging a plurality of SIP NOTIFY messages 409, 413, 417, 421, the plurality of SIP NOTIFY messages collectively including the listing of call appearance information, the call appearance information further comprising one of a call identifier, a From field, a To field, a call state field (active, on-hold, etc), and session description protocol information, where each of the SIP NOTIFY messages are responded to with a SIP OK message 411, 415, 419, 423 respectively, from the wireless communication unit 401 to the network switch.

Figure 5:
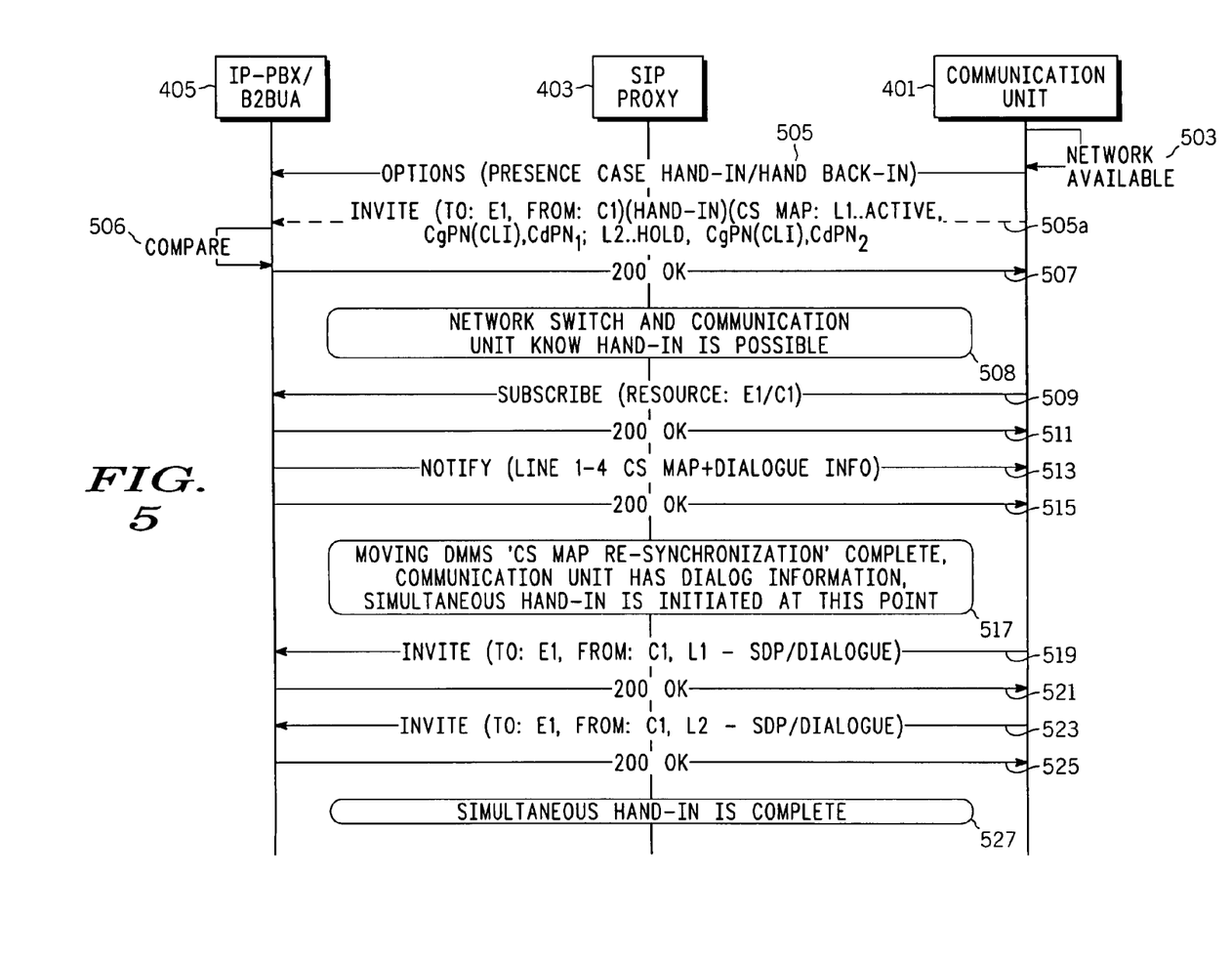
FIG. 5 depicts a ladder diagram illustrating an exemplary embodiment of the signaling interaction between a wireless communication unit and network switch for handing in calls from one network to another.

Referring to FIG. 5, a ladder diagram will be discussed and described that illustrates an exemplary embodiment of the signaling interaction between a wireless communication unit 401 and network switch 405, e.g. IP-PBX/B2BUA, through a SIP Proxy 403, where the signaling interaction is directed to handing in calls from one network to another. FIG. 5 shows method embodiments for effecting a handover or handin of calls to a wireless communication unit that is operating in a loosely coupled network comprising a first and a second communication network as the unit moves or is handed in or over from the second to the first communication network. Generally the method can be viewed as being practiced at least in part in a network switch, such as network switch 112, 300 or in a wireless communication unit, such as wireless communication unit 101, 200 however the method can be practiced in other apparatus with similar functionality. Some of the discussion below will be a review of concepts and principles explained above and thus will be provided more in a summary form. In overview the ladder diagram depicts various embodiments of a method of exchanging messages in the first network, the messages regarding call appearance information for the communication unit. The exchanging messages is undertaken in order to determine whether one or more calls for the communication unit that exists in a second network can be handed in to the first network as the communication unit switches from operating in the second network to operating in the first network. When it is determined that the calls can be handed over or handed in this handin is initiated.

In detail, at 503 as indicated, the communication unit 401 determines that the first network, e.g. WLAN is available, associates with an access point, etc. as discussed earlier. At 505 a SIP OPTIONS message including presence case, for example, hand-in or hand back in, etc. and a call state map similar to CS Map depicted in optional message 505*a* is sent from the communication unit 401 to the network switch 405. At 506 the network switch compares the CS Map with corresponding information, e.g. a call state map that is local to the network switch, to decide whether a call or multiple calls presently within or routed through the second network to the communication unit can be handed in and routed through the first network to the communication unit. This primarily amounts to the network switch deciding whether all of the calls in the second network are recognized by the network switch, e.g. are they routed through (anchored) with the network switch and thus show up in the local call state map in a manner such that a particular call can be resolved.

Another embodiment for this message is depicted by the dashed line 505*a*. Here alternatively, rather than the SIP OPTION message a SIP INVITE message can be forwarded from the communication unit. The SIP INVITE message can take a variety of forms and for example can comprise fields; To: E1 (enterprise or WLAN address or number)/From C1 (WAN or cellular number), type of request: handin or hand back in, and a call state map including L1 (line 1) state (active or hold)-CgPN (CLI) (calling party number or address), CdPN$_1$ (called party number or address), and if a second call is present and a handin of that call is allowed, L2-hold, CgPN, CdPN$_2$. Note that this is a special INVITE message with a type of request=handin, etc. While the INVITE message conceivably can take many forms it will have to convey to the network switch a type of request, namely handin, call identifying information and the communication unit identities in the respective networks. Note that the SIP INVITE and SIP OPTION message in essence accomplish the same task, namely inform the network switch as to the status and identity of calls in the second network and query the switch as to whether the calls are recognized. Note also that the network switch can interpret the INVITE as a request to effect or initiate the handin of the call, if possible, without further action by the communication unit and thus the INVITE was an initiation of the handin, albeit conditional initiation, by the communication unit.

After the comparison at 506 the network switch returns a 200 OK message, acknowledging the query and indicating that the call state maps match and thus a handin is possible, e.g. a handin decision is affirmative. If the call state maps had not matched, e.g. one or more calls were not recognized, or perhaps the network switch was otherwise unable to facilitate a handin, the switch would return a negative message, such as a 403 "Forbidden" message indicating service is not available or the like. If a handin is not possible, the communication unit can continue operating in the second network until one or more of the calls have been discontinued or otherwise drop or discontinue the calls and thereafter effect a handin of the unit and begin operating on the WLAN.

In comparing the calls a number of situations may be presented. For example both calls, whether active or on hold, may be recognized by the network switch indicating they or at least the bearer portion of the calls are routed through the switch. This would be the likely result for any call that had been placed or directed to the WLAN number or address of the communication unit at some point during the call setup or call and any call made by the communication unit to a WLAN number or through the network switch. Note this would include calls made to the WLAN number and then forwarded to the WAN, e.g. while the communication unit is operating in the WAN. If one of the calls was from another communication unit that is not present in the WLAN and directed or addressed to the WAN number for the communication unit, it will not ordinarily be routed through the network switch and thus will not be recognized.

Note that even if one call is recognized and the other(s) is not, normally the switch should not return a SIP OK message. This is due to the complexity problems associated with a communications unit operating simultaneously in both networks as it would have to do in order to keep both calls available. The alternative would be to drop the call that is not recognized, although without more the communication unit does not know which one that may be. Thus it is preferable to return an OK message only if all calls are recognized in many situations.

After the SIP OK message has been returned the network switch and communication unit know that a handin is possible as suggested by the note at 508. This was accomplished by exchanging messages in the first communication network corresponding to call appearance information and deciding whether a call within the second communication network can be handed in to the first communication network based on the exchange of the messages corresponding to the call appearance information and providing a corresponding decision as reflected by the SIP OK message 507.

Note that the exchanging the messages corresponding to the call appearance information further comprises exchanging the call appearance information and receiving an acknowledgment when the call appearance information is recognized, the acknowledgment indicating that the decision is affirmative. The call appearance information comprises a call state map with a listing of call appearances, with each member of the listing comprising one of: a call identifier, a From field, a calling party number, a To field, a called party number, a call state field, and session description protocol (SDP) information. Two embodiments were discussed for exchanging the messages corresponding to the call appearance information and these further comprise a wireless communication unit querying a network switch using one of a Session Initiation Protocol (SIP) INVITE message and SIP OPTIONS message, each respectively including call appearance information for calls in the second communication network; receiving a SIP OK message indicating the network switch recognizes the call appearance information for the calls in the second communication network, and deciding that the decision is affirmative based on the receiving the SIP OK message.

Then the communication unit sends a SIP SUBSCRIBE (Resource E1/C1) message 509 to the network switch. This message is known and basically informs the switch that the communication unit is present on the network and requests updated information relevant to the communication unit. The SUBSCRIBE message is acknowledged at 511 and followed with a NOTIFY (line 1–4 CS Map+Dialog) message 513 from the network switch. This allows the communication unit to synchronize it's local call state map with the network switch for all four lines and tells the communication unit specific information (session IDs) for identifying the calls that are present in the second network to the network switch, for example the calls on line 1 and line 2. Thus as indicated at 517 a handin can be initiated by the communication unit at this point.

The hand in is then initiated by the communication unit sending the SIP INVITE message 519 where the message includes: To: E1, From: C1, L1-SDP/Dialogue), where the Dialogue identifies the call on L1 and is the information obtained from the NOTIFY message 513. Thus initiating the handin of the call to the first communication network further comprises sending to the network switch a second SIP INVITE message comprising a call identifying field, a To field with a first identity for the wireless communication unit corresponding to the first communication network and a From field with a second identity for the wireless communication unit corresponding to the second communication network. This INVITE message is acknowledged by the OK message 521.

Note that where there are more than one call to be handed in another SIP INVITE message 523 with analogous information for the second call is sent to the switch by the communication unit and acknowledged by the OK message 525. Thus when the initiating the handin of the call further comprises initiating a handin of a plurality of calls and the initiating the handin of the plurality of calls further comprises sending the network switch a plurality of the second SIP INVITE messages corresponding, respectively, to each of the plurality of calls and comprising call identity information for the each of the plurality of calls, wherein the plurality of calls can be concurrently handed in to the first communication network. The network switch is now able to bridge in the call legs for the called parties to call legs or connections with the communication unit and drop any or all call legs to the second communication network. The calls are handed in to the first communication network in the same state they had when they were coupled through the second communication network and this is accomplished without operator intervention or perhaps even knowledge. Of course a notice can be provided to the operator via the display on the communication unit, or the operator can be involved, e.g. possible in a handin approval mode, etc. As 527 suggests the handin or simultaneous handin is now complete.

Figure 6:
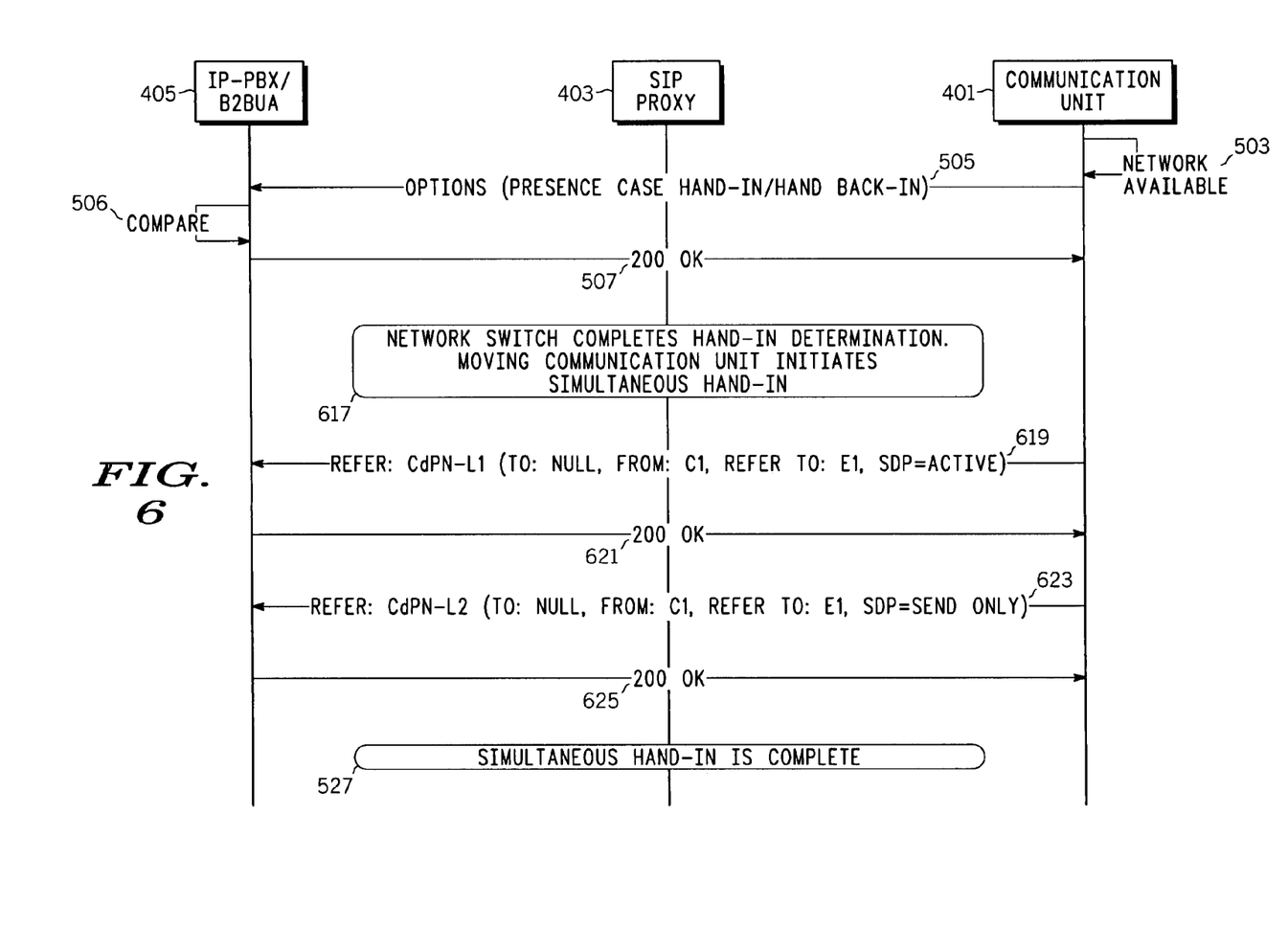
FIG. 6 depicts a ladder diagram illustrating another exemplary embodiment of the signaling interaction between a wireless communication unit and network switch for handing in calls from one network to another.

Referring to FIG. 6, another ladder diagram will be discussed and described that illustrates a further exemplary embodiment of the signaling interaction between a wireless communication unit 401 and network switch 405, e.g. IP-PBX/B2BUA, through a SIP Proxy 403, where the signaling interaction is directed to handing in calls from one network to another. FIG. 6 shows further method embodiments for effecting a handover or handin of calls to a wireless communication unit that is operating in a loosely coupled network comprising a first and a second communication network as the unit moves or is handed in or over from the second to the first communication network. Again generally the method can be viewed as being practiced at least in part in a network switch, such as network switch 112, 300 or in a wireless communication unit, such as wireless communication unit 101, 200 however the method can be practiced in other apparatus with similar functionality. Much of the discussion below will be a review of concepts and principles explained above, particularly with reference to FIG. 5, and thus will be provided more in a summary form. In overview the ladder diagram depicts various embodiments of a method of exchanging messages in the first network, the messages regarding call appearance information for the communication unit. The exchanging messages is undertaken in order to determine whether one or more calls for the communication unit that exists in a second network can be handed in to the first network as the communication unit switches from operating in the second network to operating in the first network. When it is determined that the calls can be handed over or handed in this handin is initiated.

In detail, the action at 503, OPTION message 505, comparison process at 506 and SIP OK message 507, the results and corresponding information were all described above with reference to FIG. 5. As noted at 617 the network switch has completed a determination that the handin is possible and so informed the communication unit. The communication unit and network switch can now initiate the handin of calls from the second network to the first network.

In the embodiment of FIG. 6, initiating the handin of the call to the first communication network further comprises sending to the network switch a SIP REFER message 619 comprising a From field with a second identity for the wireless communication unit corresponding to the second communication network, e.g. C1, a field identifying the call, such as a To field with the CdPN for Line 1, alternatively an SDP=active for the active call, or alternatively a Request URI that identifies the called party as shown (REFER: CdPN-L1, etc), and a Refer to field with a first identity for the wireless communication unit corresponding to the first communication network, e.g. E1. The REFER message 619 is acknowledged by the SIP OK message 621. When the initiating the handin of the call further comprises initiating a handin of a plurality of calls, such as two or more calls, the initiating the handin of the plurality of calls further comprises sending the network switch a plurality of the SIP REFER messages corresponding, respectively, to each of the plurality of calls and comprising call identity information for the each of the plurality of calls, wherein the plurality of calls can be concurrently handed in to the first communication network. SIP REFER message 623 illustrates a message being sent to the network switch to effect a handin of a second call. This message 623 is acknowledged by the SIP OK message 625. Note that in this case since the first call included SDP=active and only one active call can be present in the WAN or in the WLAN any other call must be on hold. In SIP REFER messages, an on hold status is reflected by SDP=send only as shown. Thus when one active and one on-hold call is being handed in the respective calls can be identified at the network switch by the SDP information. If both calls are on hold the Request URI field as in REFER: Request URI=respective CdPN as shown by messages 619, 623 can be used to identify the particular call. Alternatively, the To field containing the respective called party number CdPN for the corresponding call, e.g. $CdPN_1$ or $CdPN_2$ can be used to identify the particular call. Alternatively appropriate Dialogue information can be used to identify one of two on hold calls.

Figure 7:
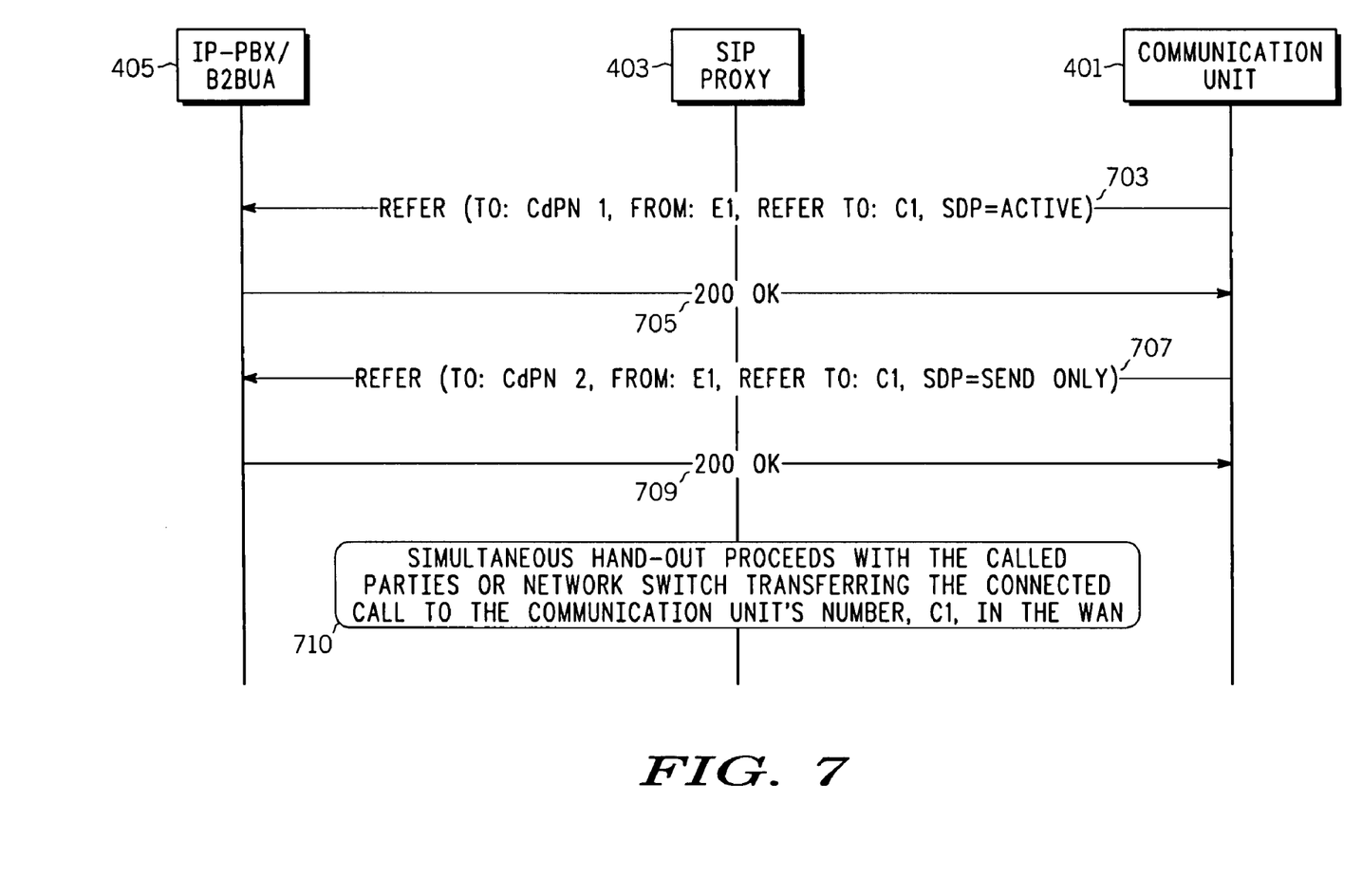
FIG. 7 shows a ladder diagram illustrating an exemplary embodiment of the signaling interaction between a wireless communication unit and network switch for handing out multiple calls from one network to another.

Referring to FIG. 7 a ladder diagram illustrating an exemplary embodiment of the signaling interaction between a wireless communication unit and network switch for handing out calls from the first communication network (WLAN) to the second communication network (WAN) will be discussed and described. The assumptions underlying FIG. 7 include that the communication unit is operating in the WLAN and has two calls that need to be handed out to the WAN as the communication unit moves to the second communication network. Note that the communication unit will need to determine that it can associate with or register with the WAN or that the signal with the WLAN is dropping and thus a hand out is indicated or the like (not specifically shown). The communication unit sends a SIP REFER message 703 to the network switch where the refer message includes To: CdPN1, From: E1, Refer to: C1, SDP=active. This REFER message is responded to by a SIP OK message 705. Thus the SIP REFER message includes call identifying information, e.g. CdPN, the communication unit's first network identity, e.g. E1, and a field specifying where to forward the call, namely the Refer to field with the communication unit's second network identity, C1. For the other call a second REFER message 707 is sent from the communication unit to the network switch and acknowledged by the OK message 709. Once the SIP REFER messages are received, either the network switch or the called party can forward the corresponding call to the communication unit's WAN address or number, C1. The communication unit can transparently place the call on hold or connect it to the user, depending on the call status.

Note that the specifics of the SIP messages are included in the document referred to earlier (RFC3261) as well as draft-ietf-sip-refer-07, published Nov. 25, 2002 and related documents available at www.ietf.org. These SIP reference documents are hereby incorporated herein by reference.

In this advantageous manner, it can be determined whether calls for a communication unit in a second communication network or WAN can be routed to or handed over to the communication unit when the unit moves into and thus is operating in a first communication network or WLAN even though the first and second communication networks are only loosely coupled (second network is not aware of the first). If possible to handin the calls, they can be simultaneously handed over, e.g. without any other actions by the communication unit between handover of one and another call. This is in stark contrast to previous practices in similar circumstances where for example calls were handed over one at a time or else have been lost to the communication unit through either dropping for example on-hold calls or forwarding them to voice mail. This contributes to increased calling party and called party convenience and satisfaction since, for example, the calls are less likely to be dropped and thus have to be re-initiated by one of the parties. This handover can be nearly transparent to the user and particular network that is providing service. It should be noted that the methods and apparatus described above for handing over calls may be implemented with different communication networks than those utilized in the examples above, provided the principles and concepts discussed and disclosed are followed by such networks.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication unit arranged and constructed for operation within a communication network comprising a first communication network and a second communication network, the wireless communication unit comprising:

a transceiver configured to support an air interface with the first communication network and with the second communication network;

a controller arranged to control and cooperatively operate with the transceiver;

to determine that the wireless communication unit is within a coverage area of the first communication network;

to exchange messages corresponding to call appearance information with a network switch in the first communication network, wherein to exchange the messages corresponding to the call appearance information further comprises querying the network switch and receiving the call appearance information from the network switch, wherein the controller is operable to decide whether a call within the second communication network can be handed in based on a comparison of the call appearance information and local call appearance information for calls in the second communication network, a favorable comparison indicating the decision is affirmative;

to decide whether a call within the second communication network can be handed in to the first communication network based on the exchange of the messages corresponding to the call appearance information and provide a corresponding decision; and to initiate a handing of the call to the first communication network only when the decision is affirmative.

2. A wireless communication unit arranged and constructed for operation within a communication network comprising a first communication network and a second communication network, the wireless communication unit comprising:
   a tranceiver configured to support an air interface with the first communication network and with the second communication network;
   a controller arranged to control and cooperatively operate with the transceiver;
      to determine that the wireless communication unit is within a coverage area of the first communication network;
to exchange messages corresponding to call appearance information with a network switch in the first communication network, wherein to exchange the messages corresponding to the call appearance information further comprises:
   querying the network switch using one of a Session Initiation Protocol (SIP) INVITE message and SIP OPTIONS message, each respectively including call appearance information for calls in the second communication network;
   receiving a SIP OK message indicating the decision is affirmative;
   sending a SIP SUBSCRIBE message including a first identity for the wireless communication unit in the first communication network and a second identity for the wireless communication unit in the second communication network; and
   receiving a listing of call appearance information for each call in the first communication networks;
   to decide whether a call within the second communication network can be handed in to the first communication network based on the exchange of the messages corresponding to the call appearance information and provide a corresponding decision; and
   to initiate a handing of the call to the first communication network only when the decision is affirmative.

3. A wireless communication unit arranged and constructed for operation within a communication network comprising a first communication network and a second communication network, the wireless communication unit comprising:
   a transceiver configured to support an air interface with the first communication network and with the second communication network;
   a controller arranged to control and cooperatively operate with the transceiver;
      to determine that the wireless communication unit is within a coverage area of the first communication network;
      to exchange messages corresponding to call apperance information with a network switch in the first communication network;
      to decide whether a call within the second communication network can be handed in to the first communication network based on the exchange of the messages corresponding to the call appearance information and provide a corresponding decision; and
   to initiate a handing of the call to the first communication network only when the decision is affirmative, wherein to initiate the handing of the call to the first communication network when the decision is affirmative further comprises sending to the network switch a Session Initiation Protocol (SIP) INVITE message comprising a call identifying field, a To field with a first identity for the wireless communication unit corresponding to the first communication network and a From field with a second identity for the wireless communication unit corresponding to the second communication network, wherein to initiate the handing of the call further comprises initiating a handing of a plurality of calls, the initiating the handing of the plurality of calls further comprises sending the network switch a SIP INVITE message corresponding to each of the plurality of calls, the SIP INVITE message corresponding to the each of the plurality of calls comprising call identity information for the each of the plurality of calls, wherein the plurality of calls can be concurrently handed in to the first communication network.

4. A wireless communication unit arranged and constructed for operation within a communication network comprising a first communication network and a second communication network, the wireless communication unit comprising:
   a transceiver configured to support an air interface with the first communication network and with the second communication network;
   a controller arranged to control and cooperatively operate with the transceiver;
      to determine that the wireless communication unit is within a coverage area of the first communication network;
      to exchange messages corresponding to call appearance information with a network switch in the first communication network;
      to decide whether a call within the second communication network can be handed in to the first communication network based on the exchange of the messages
   corresponding to the call apperance information and provide a corresponding decision; and
to initiate a handing of the call to the first communication network only when the decision is affirmative, wherein to initiate the handing of the call to the first communication network when the decision is affirmative further comprises sending to the network switch a SIP REFER message with a From field with a second identity for the wireless communication unit corresponding to the second communication network, a To field identifying the call, and a Refer to field with a first identity for the wireless communication unit corresponding to the first communication network, and wherein to initiate the handing of the call comprises initiating a handing of a plurality of calls, the initiating the handing of the plurality of calls further comprises sending the network switch a SIP REFER message corresponding to each of the plurality of the calls, wherein the plurality of calls can be concurrently handed in to the first communication network.

5. A communication network switch operable to route calls for a first communication network, the communication network switch comprising:
   a switching function operable to couple the first communication network to a second communication network, where the first communication network and the second communication network comprise a coupled communication network; and
   a controller arranged to control and cooperatively operate with the switching function: to exchange messages corresponding to call apperance information with a wireless communication unit, to decide whether a call within the second communication network can be handed in to the first communication network based in the exchange of the messages corresponding to the call apperance information and providing a corresponding decision; and initiating a handing of the call to the first communication network only when the decision is affirmative, wherein to exchange the messages corresponding to the call appearance information further comprises:

receiving a query from the wireless communication unit, the query in one of a Session Initiation Protocol (SIP) INVITE message and SIP OPTIONS message, the one of the SIP INVITE and the SIP OPTIONS message respectively including call appearance information for calls in the second communication network;

comparing the call appearance information to local call appearance information to provide a comparison; and sending a SIP OK message when the comparison is favorable, thereby indicating the decision is affirmative.

6. A communication network switch operable to route calls for a first communication network, the communication network switch comprising:

a switching function operable to couple the first communication network to a second communication network, where the first communication network and the second communication network comprise a coupled communication network; and a controller arranged to control and cooperatively operate with the switching function;

to exchange messages corresponding to call appearance information with a wireless communication unit;

to decide whether a call within the second communication network can be handed in to the first communication network based on the exchange of the messages corresponding to the call appearance information and provide a corresponding decision; and to initiate a handin of the call to the first communication network only when the decision is affirmative, wherein to initiate the handing of the call to the first communication network when the decision is affirmative further comprises:

receiving from the wireless communication unit a Session Initiation Protocol (SIP) INVITE message comprising a call identifying field, a To field with a first identity for the wireless communication unit corresponding to the first communication network and a From field with a second identity for the wireless communication unit corresponding to the second communication network; and when the call is a plurality of calls, receiving a plurality of SIP INVITE messages corresponding, respectively, to the plurality of calls such that the plurality of calls can be concurrently handed in.

7. A communication network switch operable to route calls for a first communication network, the communication network switch comprising:

a switching function operable to couple the first communication network to a second communication network, where the first communication network and the second communication network comprise a coupled communication network; and a controller arranged to control and cooperatively operate with the switching function;

to exchange messages corresponding to call appearance information with a wireless communication unit;

to decide whether a call within the second communication network can be handed in to the first communication network based on the exchange of the messages corresponding to the call apperance information and provide a corresponding decision; and to initiate a handin of the call to the first communication network only when the decision is affirmative, wherein to initiate the handing of the call to the first communication network when the decision is affirmative further comprises:

receiving from the wireless communication unit a Session Initiation Protocol (SIP) REFER message with a From field with a second identity for the wireless communication unit corresponding to the second communication network, a To field identifying the call, and a Refer to field with a first identity for the wireless communication unit corresponding to the first communication network; and when the call is a plurality of calls, receiving a plurality of SIP REFER messages corresponding, respectively, to the plurality of calls such that the plurality of calls can be concurrently handed in.

8. A method for facilitating handing calls from a second communication network to a first communication network in a coupled communication network, the method comprising:

exchanging messages in the first communication network corresponding to call appearance information, wherein the exchanging the messages corresponding to the call appearance information further comprises:

a wireless communication unit querying a network switch using one of a Session Initiation Protocol (SIP) INVITE message and SIP OPTIONS message, each respectively including call appearance information for calls in the second communication network, receiving a SIP OK message indicating the network switch recognizes the call appearance information for the calls in the second communication network, and deciding that the decision is affirmative based on the receiving the SIP OK message; and wherein the initiating the handin of the call to the first communication network further comprises sending to the network switch a second SIP INVITE message comprising a call identifying field, a To field with a first identity for the wireless communication unit corresponding to the first communication network and a From field with a second identity for the wireless communication unit corresponding to the second communication network;

deciding whether a call within the second communication network can be handed in to the first communication network based on the exchange of the messages corresponding to the call appearance information and providing a corresponding decision; and initiating a handing of the call to the first communication network only when the decision is affirmative.

9. The method of claim 8 wherein the initiating the handing of the call further comprises initiating a handing of a plurality of calls, the initiating the handing of the plurality of calls further comprises sending the network switch a plurality of the second SIP INVITE messages corresponding, respectively, to each of the plurality of calls and comprising call identity information for the each of the plurality of calls, wherein the plurality of calls can be concurrently handed in to the first communication network.

10. A method for facilitating handing calls from a second communication network to a first communication network in a coupled communication network, the method comprising:

exchanging messages in the first communication network corresponding to call appearance information, wherein the exchanging the messages corresponding to the call appearance information further comprises:
a wireless communication unit querying a network switch using one of a Session Initiation Protocol (SIP) INVITE message and SIP OPTIONS message, each respectively including call appearance information for calls in the second communication network
receiving a SIP OK message indicating the network switch recognizes the call appearance information for the calls in the second communication network, and
deciding that the decision is affirmative based on the receiving the SIP OK message; and
wherein the initiating the handing of the call to the first communication network further comprises sending to the network switch a SIP REFER message comprising a From field with a second identity for the wireless communication unit corresponding to the second communication network, a To field identifying the call, and a Refer to field with a first identity for the wireless communication unit corresponding to the first communication network;
deciding whether a call within the second communication network can be handed in to the first communication network based on the exchange of the messages corresponding to the call appearance information and providing a corresponding decision; and
initiating a handing of the call to the first communication network only when the decision is affirmative.

11. The method of claim 10 wherein the initiating the handing of the call further comprises initiating a handing of a plurality of calls, the initiating the handing of the plurality of calls further comprises sending the network switch a plurality of the SIP REFER messages corresponding, respectively, to each of the plurality of calls and comprising call identity information for the each of the plurality of calls, wherein the plurality of calls can be concurrently handed in to the first communication network.

12. A method for facilitating handing calls from a second communication network to a first communication network in a coupled communication network, the method comprising:
exchanging messages in the first communication network corresponding to call appearance information, to decide whether a call within the second communication network can be handed in to the first communication network based on the exchange of the messages corresponding to the call apperance information and providing a corresponding decision; and
initiating a handing of the call to the first communication network only when the decision is affirmative, wherein the exchanging the messages corresponding to the call appearance information further comprising:
receiving at a network switch a query from a wireless communication unit, the query in one of a Session Initiation Protocol (SIP) INVITE message and SIP OPTIONS message, the one of the SIP INVITE and the SIP OPTIONS message respectively including call appearance information for calls in the second communication network;
comparing the call appearance information to local call appearance information to provide a comparison; and
sending a SIP OK message when the comparison is favorable, thereby indicating the decision is affirmative; and
the initiating the handing of the call to the first communication network when the decision is affirmative further comprises:
receiving from the wireless communication unit a second SIP INVITE message comprising a call identifying field, a To field with a first identity for the wireless commnunication unit corresponding to the first communication network and a From field with a second identity for the wireless communication unit corresponding to the second communication network; and
when the call is a plurality of calls, receiving a plurality of second SIP INVITE messages corresponding, respectively, to the plurality of calls such that the plurality of calls can be concurrently handed in.

13. A method for facilitating handing calls from a second communication network to a first communication network in a coupled communication network, the method comprising:
exchanging messages in the first communication network corresponding to call appearance information, to decide whether a call within the second communication network can be handed in to the first communication network based on the exchange of the messages corresponding to the call appearance information and providing a corresponding decision; and
initiating a handing of the call to the first communication network only when the decision is affirmative, wherein the exchanging the messages corresponding to the call appearance information further comprising:
receiving at a network switch a query from a wireless communication unit, the query in one of a Session Initiation Protocol (SIP) INVITE message and SIP OPTIONS message, the one of the SIP INVITE and the SIP OPTIONS message respectively including call appearance information for calls in the second communication network;
comparing the call appearance information to local call appearance information to provide a comparison;
sending a SIP OK message when the comparison is favorable, thereby indicating the decision is affirmative; and
the initiating the handin of the call to the first communication network when the decision is affirmative further comprises:
receiving from the wireless communication unit a Session Initiation Protocol (SIP) REFER message comprising a From field with a second identity for the wireless communication unit corresponding to the second communication network, a To field identifying the call, and a Refer to field with a first identity for the wireless communication unit corresponding to the first communication network; and
when the call is a plurality of calls, receiving a plurality of SIP REFER messages corresponding, respectively, to the plurality of calls such that the plurality of calls can be concurrently handed in.

* * * * *

UNITED STATES PATENT AND TRADEMARK OFFICE
CERTIFICATE OF CORRECTION

| | | |
|---|---|---|
| PATENT NO. | : 7,031,280 B2 | |
| APPLICATION NO. | : 10/831824 | |
| DATED | : April 18, 2006 | |
| INVENTOR(S) | : Niranjan N. Segal | |

It is certified that error appears in the above-identified patent and that said Letters Patent is hereby corrected as shown below:

In Claim 5, column 21, line 2, delete "in" and replace with --on--.
In Claim 5, column 21, line 4, delete "providing" and replace with --provide--.

Signed and Sealed this

Twenty-first Day of November, 2006

JON W. DUDAS
*Director of the United States Patent and Trademark Office*